United States Patent
Gou et al.

(10) Patent No.: US 9,860,858 B2
(45) Date of Patent: Jan. 2, 2018

(54) METHOD AND DEVICE FOR SIGNALING CONFIGURATION, SENDING OR RECEPTION

(71) Applicant: XI'AN ZHONGXING NEW SOFTWARE CO. LTD., Xi'An (CN)

(72) Inventors: Wei Gou, Shenzhen (CN); Bo Dai, Shenzhen (CN); Shuqiang Xia, Shenzhen (CN)

(73) Assignee: XI'AN ZHONGXING NEW SOFTWARE CO. LTD. (CN)

( * ) Notice: Subject to any disclaimer, the term of this patent is extended or adjusted under 35 U.S.C. 154(b) by 72 days.

(21) Appl. No.: 14/400,411

(22) PCT Filed: May 6, 2013

(86) PCT No.: PCT/CN2013/075207
§ 371 (c)(1),
(2) Date: Nov. 11, 2014

(87) PCT Pub. No.: WO2013/166947
PCT Pub. Date: Nov. 14, 2013

(65) Prior Publication Data
US 2015/0131646 A1 May 14, 2015

(30) Foreign Application Priority Data

May 11, 2012 (CN) .......................... 2012 1 0146387

(51) Int. Cl.
*H04W 56/00* (2009.01)
*H04W 76/04* (2009.01)
*H04L 5/00* (2006.01)

(52) U.S. Cl.
CPC ........... *H04W 56/00* (2013.01); *H04L 5/0053* (2013.01); *H04W 76/046* (2013.01); *H04L 5/0005* (2013.01)

(58) Field of Classification Search
CPC ... H04W 56/00; H04W 76/046; H04W 48/08; H04W 72/042; H04L 5/0053;
(Continued)

(56) References Cited

U.S. PATENT DOCUMENTS 6,075,814 A * 6/2000 Yamano .................. H04L 12/10
375/222
7,373,504 B1 * 5/2008 Belgaied ................... H04L 9/00
713/164

(Continued)

FOREIGN PATENT DOCUMENTS

CN  102036407   4/2011
CN  102223696   10/2011

(Continued)

OTHER PUBLICATIONS

International Search Report for International Patent Application No. PCT/CN2013/075207 dated Jul. 11, 2013.

*Primary Examiner* — Luat Phung
*Assistant Examiner* — Thomas R Cairns
(74) *Attorney, Agent, or Firm* — McAndrews, Held & Malloy, Ltd.

(57) ABSTRACT

Provided are a method and device for signaling configuration, sending or reception, the method for signaling configuration comprises includes: a base station configures the signaling describing the subframe bearing the Synchronization Track Reference Signals (STRS) for a carrier, and the base station does not send the STRS and/or the PSS/SSS in the carrier when the signaling configured is null, while the base station sends the PSS/SSS in the carrier in a predetermined manner and sends the STRS in the carrier according to the signaling configuration information when the signaling configured is not null; the base station sends the signaling to a User Equipment (UE); the UE receives the signaling sent by the base station, analyzes the signaling, and judges
(Continued)

the PSS/SSS is not sent in the carrier when the signaling is null, or judges the PSS/SSS is sent in the carrier when the signaling is not null.

16 Claims, 4 Drawing Sheets

(58) Field of Classification Search
CPC ..... H04L 5/0048; H04L 5/005; H04L 5/0005; H04J 11/0079
USPC .......................................................... 370/350
See application file for complete search history.

(56) References Cited

U.S. PATENT DOCUMENTS

| | | | | |
|---|---|---|---|---|
| 8,223,891 | B2* | 7/2012 | Kent | H04L 5/0007 375/326 |
| 8,369,280 | B2* | 2/2013 | Dinan | H04L 1/00 370/330 |
| 8,526,964 | B2* | 9/2013 | Wei | H04W 48/08 455/422.1 |
| 9,107,213 | B2* | 8/2015 | Ng | H04W 72/0446 |
| 9,265,040 | B2* | 2/2016 | Dinan | H04L 27/2692 |
| 9,276,710 | B2* | 3/2016 | Damnjanovic | H04L 5/001 |
| 2004/0242258 | A1* | 12/2004 | Kim | H04W 52/245 455/522 |
| 2009/0207888 | A1* | 8/2009 | Yamasuge | H04L 5/0007 375/141 |
| 2011/0149894 | A1 | 6/2011 | Luo et al. | |
| 2013/0010715 | A1* | 1/2013 | Dinan | H04W 72/0406 370/329 |
| 2013/0028204 | A1* | 1/2013 | Dinan | H04W 72/0453 370/329 |
| 2013/0188620 | A1* | 7/2013 | Dinan | H04W 56/0005 370/336 |
| 2014/0003385 | A1* | 1/2014 | Dinan | H04W 16/02 370/329 |
| 2014/0161209 | A1* | 6/2014 | Limberg | H04L 5/0016 375/299 |
| 2015/0036609 | A1* | 2/2015 | Kim | H04W 56/00 370/329 |

FOREIGN PATENT DOCUMENTS

| | | |
|---|---|---|
| CN | 102301667 | 12/2011 |
| WO | WO2011082671 * | 7/2011 |

* cited by examiner

METHOD AND DEVICE FOR SIGNALING CONFIGURATION, SENDING OR RECEPTION

CROSS-REFERENCE TO RELATED APPLICATIONS/INCORPORATION BY REFERENCE

This application is a 371 of International Patent Application No. PCT/CN2013/075207, filed May 6, 2013, which claims priority to Chinese Patent Application No. 201210146387.2, filed May 11, 2012, entitled "METHOD AND DEVICE FOR SIGNALING CONFIGURATION, SENDING OR RECEPTION". The above-identified applications are hereby incorporated herein by reference in their entirety.

TECHNICAL FIELD

The patent document relates to the field of communications, in particular to a method and device for signaling configuration, sending or reception.

BACKGROUND

With the development of the mobile communication industry and the growing demand for mobile data services, the demand for the speed and Quality of Service (QoS) of the mobile communications becomes increasingly higher. Based on the above, reasons, the research and development on the next generation mobile communication system, typically a Long-Term Evolution (LTE) project which is initiated by the 3rd Generation Partnership Project (3GPP) and is capable of providing a spectral bandwidth of 20 MHz (megahertz) at most, have already been carried out before the large-scale commercial use of the 3rd-Generation (3G) mobile communications. With the further evolution of the network, the Long-Term Evolution Advance (LTE-A), as an evolved system of the LTE, is capable of providing a spectral bandwidth up to 100 MHz and supporting communications with higher flexibility and higher quality, meanwhile, the LTE-A system has good backward compatibility. The LTE-A system has a plurality of Component Carriers (CCs). One LTE terminal may only operate on a certain backward-compatible CC, while a LTE-A terminal with a higher capacity may transmit on a plurality of CCs the same time. That is, a multi-carrier aggregation technology may be implemented to enable an LTE-A terminal to transmit and receive data in a plurality of component carriers simultaneously, thereby achieving the purpose of increasing the bandwidth.

The LTE-A system supports the multi-carrier aggregation technology to achieve data transmission in a larger bandwidth by multi-carrier aggregation. A base station may manage at most five carriers which are called component carriers and are all backward compatible so as to support operations of a User Equipment (UE) in an early LTE Release. The base station may configure a plurality of component carriers for a UE, and select to activate some or all of the component carriers for the UE, and the activated component carriers can provide data transmission for the UE.

In the research at this stage, the LTE R11 stage has a new requirement in terms of utilization of spectrum resources, energy conservation of networks and interference suppression between cells on the basis of the multi-carrier aggregation technology. For achieving this purpose, New Carrier Type is proposed currently by means of the application of the carrier aggregation technology. The new carrier type has a distinctive feature, that is, more new technologies can be applied therein without considering the backward compatibility in the design. For example, the new carrier in the current LTE R11 is defined that it needs to be applied together with at least one compatible carrier, and the Cell-specific Reference Signals (CRS) of LTE R8 is not configured in the new carrier to avoid severe CRS interference of the neighboring cells at the cell edge, in particular the CRS interference between macro cells and micro cells in a Heterogeneous Network (Het Net) scenario. However, not configuring LTE R8 CRS in the new carrier may result in a problem that there is no reference signals used for synchronization tracking in the new carrier. In discussions on the new carrier type up to now, some companies propose that a Primary Synchronization Signal/Secondary Synchronization Signal (PSS/SSS) is not configured to be sent in some of the new carriers (e.g., synchronous new carriers), the PSS/SSS resources are used to transmit data, and the UE keeps synchronization with the new carrier through a compatible carrier. Some of the new carriers (e.g., asynchronous new carriers) are still configured with the PSS/SSS. A reference signal mainly used for synchronization tracking is introduced into the new carrier, and this reference signal is called Synchronization Track Reference Signal (STRS). The current sending period of the STRS is 5 ms. As to the problem to send the STRS in a full bandwidth or sub-band mode (sending in N Resource Blocks (RB) in the carrier, N is an integer greater than or equal to 6) is still in discussion, and there is no determined mode currently. That is to say, the problem in the related art to use what kinds of modes to send the STRS is still not solved such that the STRS cannot be sent in a new carrier.

Moreover, up to now, introducing the STRS in LTE R11 will still bring large interference between neighboring cells, although compared with the LTE Rel-8 CRS, the interference only occurs in the subframe hearing the STRS (refer to FIG. 1 that shows a structural schematic diagram of radio frames and subframes in the LTE standard according to the related art), the interference is still introduced and will affect the increase of edge efficiency. The interference of the LTE Rel-8 CRS mainly affects the demodulation performance, the STRS is defined here not to be applied in data demodulation, but the interference of the STRS between neighboring cells will still affect the synchronization/synchronization tracking performance. If the later releases define that STRS could be used for demodulation, likewise the interference of the STRS between neighboring cells will affect the demodulation. However, there is no solution in the related an for solving the interference generated by the STRS.

In addition, regarding the transmission of the new carrier, whatever a synchronous new carrier or an asynchronous new carrier, at the base station side, a manner of transmitting the new carrier and the matched compatible carrier simultaneously and synchronously (it is considered to be synchronous within the range of the error defined in Standard Protocols) is adopted currently. However, after the new carrier and the matched compatible carrier are transmitted via the air interface, the different frequency bands of carriers, the ability of bypassing obstacles and the movement speed and directions of the UE will finally result in that the two carriers sent simultaneously at the base station are not synchronous in time and also have different frequency offsets when they arrive at the UE. Hence, when the new carrier is subjected to an initial measurement at the UE side, the UE side does not know whether the new carrier is synchronous with the matched compatible carrier (because they are synchronous at the base station side, but may be not synchronous when they arrive at the UE side), and the UE side does not know whether the UE itself is synchronous with the new carrier, and also does not know whether the PSS/SSS is sent in the to-be-measured new carrier, such that the UE needs to execute several possible processes to detect whether the UE itself is synchronous with the new carrier and to detect whether the PSS/SSS or STRS is configured in the new carrier. Obviously, in the related art, it is aimless to detect the new carrier configuration during the initial measurement for the new carrier at the UE side, which undoubtedly increases the processing complexity of the UE side.

Aiming at the problem that it is aimless to detect the new carrier configuration during the initial measurement for the new carrier at the UE side, there is no effective solving method proposed in the related art.

SUMMARY

The embodiments of the disclosure provide a method and device for signaling configuration, sending or reception to solve the above-mentioned technical problems.

According to one embodiment of the disclosure, a method for signaling configuration is provided. According to the method, a base station configures for a carrier a signaling describing at least one subframe bearing Synchronization Track Reference Signals (STRS), wherein the base station does not send the STRS and/or a Primary Synchronization Signal/Secondary Synchronization Signal (PSS/SSS) in the carrier when the signaling configured is null, while the base station sends the PSS/SSS in the carrier according to a predetermined manner and sends the STRS in the carrier according to the configuration information of the signaling when the signaling configured is not null. The base station sends the signaling to a User Equipment (UE), and the UE receives the signaling sent by the base station, analyzes the signaling, and judges that the PSS/SSS is not sent in the carrier when the signaling is null, or judges that the PSS/SSS is sent in the carrier when the signaling is not null.

In the described embodiment, when the signaling is null, the UE determines that the carrier is synchronous in time and frequency with a compatible carrier corresponding to the carrier. The UE executes a synchronous operation in time and frequency between the UE and the carrier, or determines that the carrier is a synchronous new carrier.

In the described embodiment, when the signaling is not null, the UE determines that the carrier is asynchronous in time and frequency with a compatible carrier corresponding to the carrier, the UE receives the PSS/SSS from the carrier, and executes a synchronous operation in time and frequency between the UE and the carrier, or determining that the carrier is an asynchronous new carrier.

In the described embodiment, the signaling includes subframe pattern information of at least one subframe bearing the STRS, wherein the subframe pattern information includes one of the following: an initial subframe offset of the at least one subframe bearing the STRS in a radio frame, a subframe pattern combination for the at least one subframe bearing STRS, and a subframe identification corresponding to the at least one subframe bearing the STRS.

In the described embodiment, a base station sends the signaling to a UE, including: the base station sends the signaling to the UE by means of one of the following messages: radio resource control connection reconfiguration (RRC Connection Reconfiguration), and measurement configuration (measConfig).

According to another embodiment of the disclosure, a device for signaling configuration is provided, including: a configuration component, configured to configure for a carrier a signaling describing at least one subframe bearing Synchronization Track Reference Signals (STRS). A processing component, configured not to send the STRS and/or a Primary Synchronization Signal/Secondary Synchronization Signal (PSS/SSS) in the carrier when the signaling configured is null, while to send the PSS/SSS in the carrier according to a predetermined manner and send the STRS according to the configuration information of the signaling in the carrier when the signaling configured is not null. A sending component, configured to send the signalling. A reception component, configured to receive the signaling sent by the sending component and analyze the signaling a reception component, configured to receive the signaling sent by the sending component and analyze the signalling. A judgment component, configured to judge that the PSS/SSS is not sent in the carrier when the signaling is null, while judge that the PSS/SSS is sent in the carrier when the signaling is not null.

In the described embodiment, the device also includes: a first determination component, configured to determine that the carrier is synchronous in time and frequency with a compatible carrier corresponding to the carrier when the judgment component judges that the signaling is null. A first execution component, configured to execute a synchronous operation in time and frequency between a User Equipment (UE) and the carrier, or determine that the carrier is a synchronous new carrier.

In the described embodiment, the device also includes: a second determination component, configured to determine that the carrier is asynchronous in time and frequency with a compatible carrier corresponding to the carrier when the judgment component judges that the signaling is not null. A second execution component, configured to receive the PSS/SSS from the carrier, and execute a synchronous operation in time and frequency between the User Equipment (UE) and the carrier; or determine that the carrier is an asynchronous new carrier.

In the described embodiment, the signaling includes subframe pattern information of at least one subframe bearing the STRS, wherein the subframe pattern information includes one of the following: an initial subframe offset of the at least one subframe bearing the STRS in the radio frame, a subframe pattern combination for the subframes bearing STRS, and a subframe identification corresponding to the at least one subframe bearing the STRS.

According to still another embodiment of the disclosure, a method for signaling sending is provided, including: a base station configures for a new carrier a signaling describing at least one subframe bearing Synchronization Track Reference Signals (STRS), and determining whether the signaling configured is null. If a determination result is positive, the base station does not send the STRS and/or Primary Synchronization Signal/Secondary Synchronization Signal (PSS/SSS) in the new carrier, and if the determination result is negative, the base station sends the PSS/SSS to the User Equipment (UE) in the new carrier according to a predetermined manner, and sends the STRS to the UE in the new carrier according to the configuration information of the signaling configured. The base station sends the signaling to the UE in a compatible carrier corresponding to the new carrier.

According to still another embodiment of the disclosure, a device for signaling sending is provided, including: a determination component, configured to configure for a new carrier a signaling describing at least one subframe bearing Synchronization Track Reference Signals (STRS), and determine whether the signaling configured is null. A first sending component, configured not to send the STRS and/or Primary Synchronization Signal/Secondary Synchronization Signal (PSS/SSS) in the new carrier when the determination result is positive, while to send the PSS/SSS to the User Equipment (UE) in the new carrier according to a predetermined manner and send the STRS to the UE in the new carrier according to the configuration information of the signaling configured when the determination result is negative. A second sending component, configured to send the signaling to the UE in a compatible carrier corresponding to the new carrier.

According to still another embodiment of the disclosure, provided is a method is for signaling reception, including: a User Equipment (UE) receives, from a compatible carrier corresponding to a new carrier, a signaling that is sent by a base station for describing at least one subframe bearing Synchronization Track Reference Signals (STRS). The UE judges whether the signaling is null, and determines that the STRS and/or a Primary Synchronization Signal/Secondary Synchronization Signal (PSS/SSS) is not carried in the new carrier, and that the new carrier is synchronous in time and frequency with the compatible carrier, if the judgment result is positive, while determines that the PSS/SSS is carried in the new carrier, receives the PSS/SSS from the new carrier, and determines that the new carrier is asynchronous in time and frequency with the compatible carrier, if the judgment result is negative.

According to still another embodiment of the disclosure, a device for signaling reception is provided, including: a reception component, configured to receive, from a compatible carrier corresponding to a new carrier, a signaling that is sent by a base station for describing at least one subframe bearing Synchronization Track Reference Signals (STRS), a judgment component, configured to judge whether the signaling is null, and determine that the STRS and/or a Primary Synchronization Signal/Secondary Synchronization Signal (PSS/SSS) is not carried in the new carrier, and that the new carrier is synchronous in time and frequency with the compatible carrier, if the judgment result is positive, while determine that the PSS/SSS is carried in the new carrier, receive the PSS/SSS from the new carrier, and determine that the new carrier is asynchronous in time and frequency with the compatible carrier, if the judgment result is negative.

By the embodiments of the disclosure, the introduction of the STRS parameters implements the diversity of the subframes sending STRS, and provides a possibility for sending the STRS between neighboring cells in a subframe-orthogonal way. Besides, by the introduced STRS parameters in the embodiments of the disclosure, it solves the problem of determining the subframe sending STRS, and also solves the problem that the base station sends, to the UE, the information of the type of a new carrier or the information whether the PSS/SSS and/or the STRS is sent in the new carrier, so as to achieve the effect of saving the signaling overhead and avoiding the UE aimlessly detecting the type of a new carrier or detecting whether the PSS/SSS and or the STRS is configured in the new carrier.

DESCRIPTION OF THE DRAWINGS

Drawings, provided for further understanding of the disclosure and forming a part of the specification, are used to explain the disclosure together with embodiments of the disclosure rather than to limit the disclosure, in the drawings.

DETAILED DESCRIPTION OF THE EMBODIMENTS

The disclosure is described below in detail by reference to the accompanying drawings in conjunction with embodiments. It should be noted that the embodiments and the characteristics of the embodiments can be combined with each other without conflict.

Figure 1:
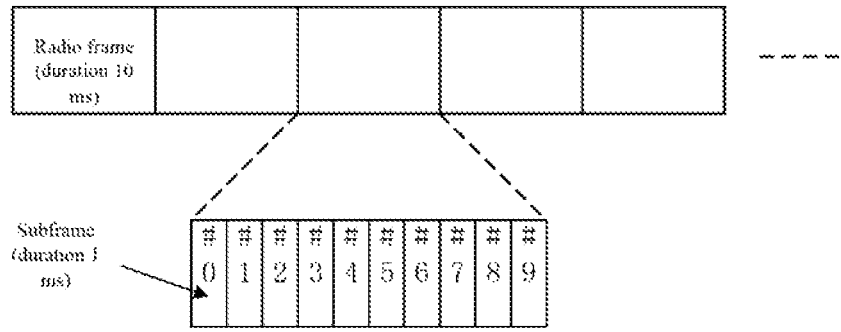
FIG. 1 shows a structural schematic diagram of a radio frame and a subframe in the LTE standard according to the related art.
Figure 2:
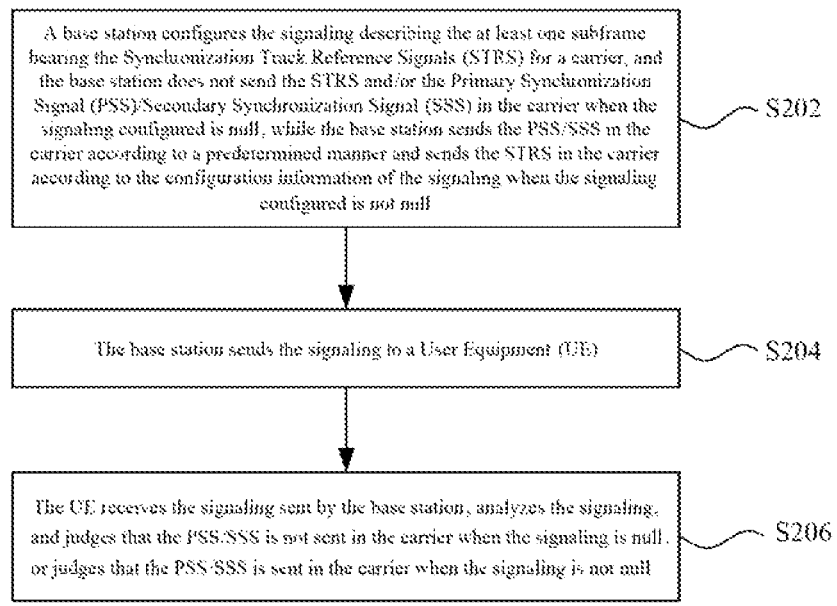
FIG. 2 shows a flowchart of a method for signaling configuration according to embodiment I of the disclosure.

FIG. 2 shows a method flowchart for signaling configuration according to embodiment I of the disclosure. As shown in FIG. 2, the method mainly includes the following steps (Step S202-Step S206):

Step S202, a base station configures the signaling describing at least one subframe bearing the Synchronization Track Reference Signals (STRS) for a carrier, and the base station does not send the STRS and/or the Primary Synchronization Signal (PSS)/Secondary Synchronization Signal (SSS) in the carrier when the signaling configured is null, while the base station sends the PSS/SSS in the carrier according to a predetermined manner and sends the STRS in the carrier according to the configuration information of the signaling when the signaling configured is not null.

Step S204, the base station sends the signaling to a User Equipment (UE).

Step S206, the UE receives the signaling sent by the base station, analyzes the signaling, and judges that the PSS/SSS is not sent in the carrier when the signaling is null, or judges that the PSS/SSS is sent in the carrier when the signaling is not null.

In this embodiment, when the base station judges that the signaling is null, the UE may determine that the carrier is synchronous with a compatible carrier corresponding to the carrier in time and frequency, further, the UE may execute a synchronous operation between the UE and the carrier in time and frequency, or determine that the carrier is a synchronous new carrier.

In this embodiment, when the base station judges that the signaling is not null, the UE may determine that the carrier is asynchronous with a compatible carrier corresponding to the carrier in time and frequency, and further, the UE may receive the PSS/SSS from the carrier and execute a synchronous operation between the UE and the carrier in time and frequency. Or the UE determines that the carrier is an asynchronous new carrier.

In this embodiment, the signaling carries subframe pattern information of the at least one subframe bearing the STRS, where, in the practical application, the subframe pattern information may contain one of the following three types of information: an initial subframe offset of the at least one subframe bearing the STRS in the radio frame, a subframe pattern combination for the at least one subframe bearing the STRS, and a subframe identification corresponding to the at least one subframe bearing the STRS.

In the practical application, when the base station sends the above-mentioned configured signaling to the UE, the signaling may be sent by carrying in one of the following messages: radio resource control connection reconfiguration (RRC Connection Reconfiguration) and measurement configuration (measConfig). Of course, other messages that also carry the signaling similarly may not be excluded for this reason, here, these two messages are only a kind of example embodiment.

Figure 3:
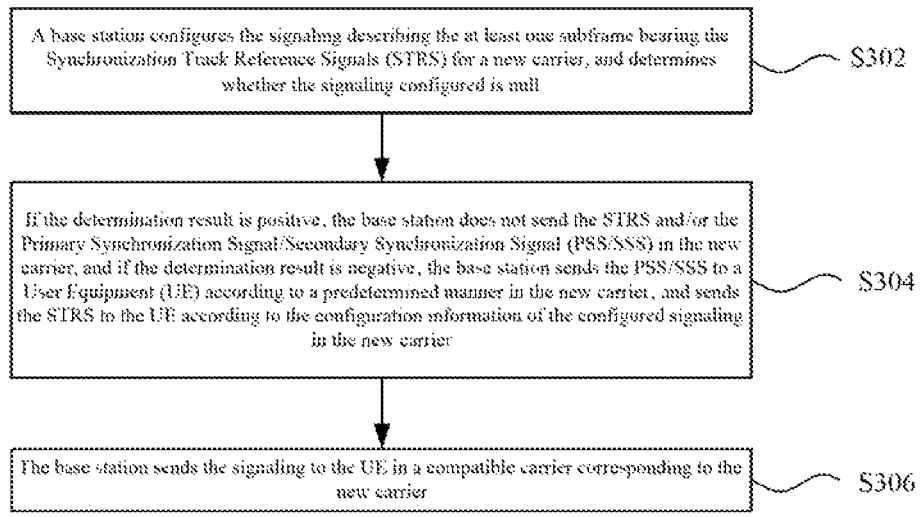
FIG. 3 shows a flowchart of a method for signaling sending according to embodiment II of the disclosure.

FIG. 3 shows a method flowchart for signaling sending according to embodiment II of the disclosure, as shown in FIG. 3, the method mainly includes the following steps (Step S302-Step S306):

Step S302, a base station configures the signaling describing the at least one subframe bearing the Synchronization Track Reference Signals (STRS) for a new carrier, and determines whether the signaling configured is null.

Step S304, if the determination result is positive, the base station does not send the STRS and/or the Primary Synchronization Signal/Secondary Synchronization Signal (PSS/SSS) in the new carrier. If the determination result is negative, the base station sends the PSS/SSS to a User Equipment (UE) according to a predetermined manner in the new carrier and sends the STRS to the UE according to the configuration information of the configured signaling in the new carrier.

Step S306, the base station sends the signaling to the UE in a compatible carrier corresponding to the new carrier.

Figure 4:
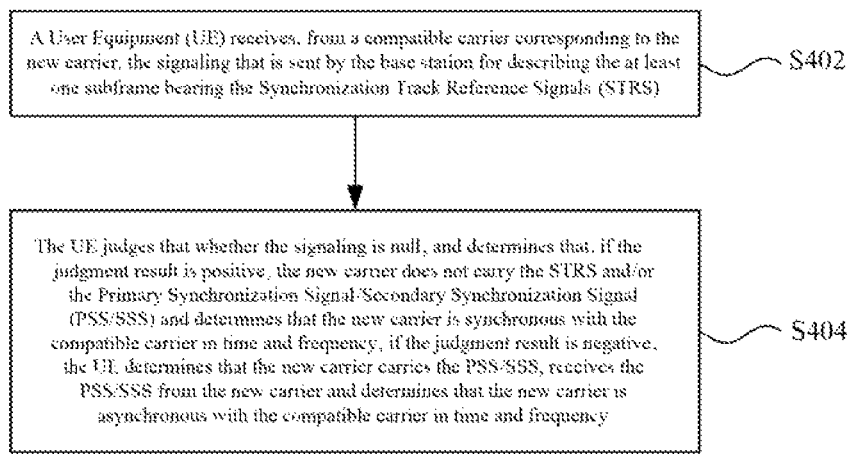
FIG. 4 shows a flowchart, of a method for signaling reception according to embodiment III of the disclosure.

FIG. 4 shows a flowchart of a method for signaling reception according to embodiment III of the disclosure, as shown in FIG. 4, the method mainly includes the following steps (Step S402-Step S404):

Step S402, a User Equipment (UE) receives, from a compatible carrier corresponding to the new carder, the signaling that is sent by the base station for describing at the least one subframe bearing the Synchronization Track Reference Signals (STRS).

Step S404, the UE judges that whether the signaling is null, and determines that, if the judgment result is positive, the new carrier does not carry the STRS is and/or the Primary Synchronization Signal/Secondary Synchronization Signal (PSS/SSS) and determines that the new carrier is synchronous with the compatible carrier in time and frequency, if the judgment result is negative, the UE determines that the new carrier carries the PSS/SSS, receives the PSS/SSS from the new carrier and determines that the new carrier is asynchronous with the compatible carrier in time and frequency.

The method for signaling configuration, the method for signaling sending and the method for signaling reception in the three above-mentioned embodiments will be described below in detail combined with example embodiments.

It should be noted that the contents included in the following example embodiments are broad enough to support the methods in the three embodiments, and will not be elaborated here separately. In this example embodiment, using a new carrier and its corresponding compatible carrier as examples, the methods (for signaling configuration, signaling sending and signaling reception) in the above-mentioned three embodiments are described in detail.

In this example embodiment, the STRS is more often applied in the new carrier mainly for synchronization tracking for a new carrier. In a Time Division Duplex (TDD) mode, the base station firstly determines the uplink/downlink configuration information used in the new carrier and then determines the subframe pattern combination that the new carrier employs to transmit the STRS in the uplink/downlink configuration. The predefined subframes may constitute various subframe pattern combinations. The base station may select a certain combination and notify the UE of this combination through the signaling, whereby making the UE know what subframes are used for bearing the STRS. In the described embodiment, in the STRS configuration, the subframes bearing the STRS configured in each radio frame are the same.

In this example embodiment, the UE may be notified of the subframe bearing the STRS by various modes. For example, in a TDD mode, the base station determines uplink/downlink configuration information used by the new carrier, the base station and the UE appoint the mode that the STRS is sent in a fixed period that is fixed through standardized protocols, and the base station notifies, through a parameter, the UE of the initial subframe information sending the STRS. In an example embodiment, the initial subframe information is described within a radio frame range. Furthermore, the base station determines the value range or set range of the parameter describing the initial subframe information for each uplink/downlink configuration, and fixes the value range or set range through protocols. The base station selects, from the value range or set range of the initial subframe information corresponding to each uplink/downlink configuration, the proper value for the parameter and sends same to the UE. In this embodiment, the respective value ranges or value sets are configured for the parameter according to different uplink/downlink configurations.

In general, the base station and the UE may appoint that the STRS is sent in a fixed period, e.g., fixed as 2 ms, 3 ms, 5 ms or 10 ms, etc, but it is convenient to select the fixed period as 5 ms or 10 ms in practical applications. Here, it is considered that the purpose of the STRS is mainly for synchronization tracking, and then by a lot of simulation evaluation, the frame structure for the LTE system is provided according to the evaluation result, and it is considered that the STRS period of 5 ms is an optimal choice and can be in balance between the performance and the overhead.

Further, the base station and the UE may appoint that the LTE is notified of the primary and auxiliary synchronization configurations of the new carrier indirectly and implicitly through the signaling. For example, when the UE receives the signaling, sent by the base station, of the combination of the subframe patterns of the STRS in the radio frame (i.e., the above-mentioned signaling) or when the parameter describing the subframe hearing the STRS in the radio frame is specific information (i.e., not null, that is, the base station configures and sends the signaling or parameter), the UE determines the subframe bearing the STRS in the new carrier. Further, the UE considers that the PSS/SSS is configured and sent in the carrier bearing the STRS, then the UE considers that the UE itself may be asynchronous with the carrier bearing the STRS, and the UE needs to receive the PSS/SSS from the carrier bearing the STRS to accomplish the synchronization of the UE and the carrier, while the UE doesn't consider that it is synchronous with the carrier bearing the STRS. Conversely, if the UE finds that the signaling or parameter in the information of the subframe pattern combination received by the UE is null (i.e., the base station does not configure to send the signaling or parameter), the UE considers that the new carrier is synchronous with the matched compatible carrier. The UE considers that the PSS/SSS is not configured in the new carrier, then the UE considers that the synchronization between the UE and the new carrier can be implemented just if the UE keeps synchronous with the compatible carrier matched with the new carrier.

Furthermore, from the base station side, when the base station confirms that the STRS is transmitted in the new carrier, the base station configures specific information for the signaling that configures the above-mentioned subframe pattern in the new carrier or the parameter describing the initial position of the subframe, and simultaneously the base station configures sending the PSS/SSS in the new carrier. When the base station confirms that the STRS is not transmitted in the new carrier, the base station configures that the signaling that configures the above-mentioned subframe pattern in the new carrier and the parameter describing the initial position of the subframe is null (i.e., the base station does not send the parameter), and simultaneously the base station does not configure sending the PSS/SSS in the new carrier.

Obviously, the indirect and implicit information may help the UE to know the subsequent execution process, or else the UE needs to detect whether the PSS/SSS exists in the new carrier. By virtue of the embodiment of the disclosure, the UE may select the corresponding process for execution without conducting any detection by the UE, thereby simplifying the complexity of the UE side process.

As to the mode that the base station and the UE appoint that the STRS is sent in a fixed period, the STRS period information does not need to be sent through the signaling, so as to reduce the signaling overhead. A parameter is introduced to describe the subframe bearing the STRS, the parameter describing the position of the first subframe bearing the STRS in a radio frame. A series of subframes bearing the STRS in the radio frame can be determined through the first subframe and the previous period information, and the same configuration may also be is applied to other radio frames, that is, the subframes bearing the STRS in all radio frames of the carrier within the signaling valid time may be the same. Here, the consideration of restraining the subframe offset within the radio frame may simplify the design to facilitate simplifying the problem and reduce the signaling overhead. It would be easier to implement configuring different subframe pattern bearing the STRS for different radio frame configurations, so as to provide more subframe patterns for the STRS and increase the flexibility. For example, if it allows different radio frames using different subframe patterns, on the basis of the fixed STRS period, it may be appointed that the first radio frame used by the even-numbered radio frames and the first radio frame used by the odd-numbered radio frames are backward adjacent in sequence. For example, the signaling describing the subframe pattern of the subframe bearing the STRS is used to notify the UE of the first subframe bearing the STRS in the even-numbered radio frame, and by default the odd-numbered radio frame uses the next subframe. Furthermore, in this mode, the number of bits that the signaling needs can be determined according to the period, e.g., if the period is 5 ms, it is defined to use 3 bit for describing the first subframes bearing the STRS in 5 different radio frames. For example, "000" represents subframe #0, "001" represents subframe #1, "010" represents subframe #2, "011" represents subframe #3 and "100" represents subframe #4. For example, an embodiment of the disclosure also supports the following mode: the base station and the UE appoint using the STRS with various fixed periods, e.g., the base station and the UE appoint that the STRS with a period of 5 ms is used in the even-numbered radio frame and the STRS with a period of 3 ms is used in the odd-numbered radio frame, and then the base station respectively configures for the two types of radio frames a parameter describing the subframe pattern in the radio frame for the UE, for respectively describing the first subframes bearing the STRS in the corresponding radio frame. Of course, the base station and the UE may also appoint to use the STRS with a period of 5 ms within consecutive N (N is a constant value) radio frames and use the STRS with a period of 3 ms within the following consecutive n (n is a fixed value and may be equal to N) radio frames. For this case, the above-mentioned signaling can be used according to the above-mentioned mode. The consecutive N radio frames may correspond to system information modification periods, i.e., the appointed STRS with different fixed periods may be used in different system information modification period. Considering that the TDD mode has multiple different uplink/downlink subframe configurations, this example embodiment further provides the value range or value set of the initial subframe parameter under various uplink/downlink subframe configurations, following is the value range or value set of the parameter:

when the uplink/downlink configuration is 0, the value range is 0, 1, or the value set is a set of one or more of combinations of 0 and 1, e.g., the set is {0}, {1}, or {0, 1};

when the uplink/downlink configuration is 1, the value range is 0, 1, 4, or the value set is a set of one or more combinations of 0, 1 and 4;

when the uplink/downlink configuration is 2, the value range is 0, 1, 3, 4, or the value set is a set of one or more combinations of 0, 1, 3 and 4;

when the uplink/downlink configuration is 3, the value range is 0, 1, or the value set is a set of one or more combinations of 0 and 1;

when the uplink/downlink configuration is 4, the value range is 0, 1, 4, or the value set is a set of one or more combinations of 0, 1 and 4;

when the uplink/downlink configuration is 5, the value range is 0, 1, 3, 4, or the value set is a set of one or more combinations of 0, 1, 3 and 4; and when the uplink/downlink configuration is 6, the value range is 0, 1, or the value set is a set of one or more combinations of 0 and 1;

where 0, 1, 3 and 4 are the first, the second, the fourth and the fifth subframe in the radio frame respectively, and the corresponding subframe numbers are #0, #1, #3 and #4.

The value of the above-mentioned initial subframe offset may also be determined according to the following mode: the value of the initial subframe offset is equal to the remainder (left over) after dividing the subframe number by the fixed period, where the fixed period is the fixed period that the base station and the UE pre-appoint for sending the STRS.

The base station and the UE appoint the value range or set range corresponding to each uplink/downlink configuration, and then determines a value of the parameter. The base station and the UE firstly determine the uplink/downlink configuration, and then further determine the subframe bearing the STRS according to the value of the parameter.

As to the mode that the base station and the UE use the pre-appointed subframe pattern combination to describe the subframe bearing the STRS, the example subframe patterns determined by a lot of simulation evaluation under each configuration in different uplink/downlink configurations of the TDD as follows:

when the uplink/downlink configuration is 2, the combination of subframe bearing the STRS is subframe #0 and subframe #5, or subframe #1 and subframe #6, or subframe #3 and subframe #8, or subframe #4 and subframe #9, or subframe #0 and subframe #3 or subframe #6 and subframe #9;

when the uplink/downlink configuration is 3, the combination of subframe bearing the STRS is subframe #0 and subframe #5, or subframe #2 and subframe #6;

when the uplink/downlink configuration is 4, the combination of subframe bearing the STRS is subframe #0 and subframe #5, or subframe #2 and subframe #6, or subframe #4 and subframe #9;

when the uplink/downlink configuration is 5, the combination of subframe bearing the STRS is subframe #0 and subframe #5, or subframe #2 and subframe #6, or subframe #3 and subframe #8, or subframe #4 and subframe #9;

when the uplink/downlink configuration is 6, the combination of subframe bearing the STRS is subframe #0 and subframe #5, or subframe #2 and subframe #6.

The base station and the UE number each subframe pattern combination in each uplink/downlink configuration, and notify the UE of the subframe bearing the STRS by sending the specific number. The base station and the UE firstly determine the uplink/downlink configuration, and then further determine the subframe pattern combination according to the number.

On the basis of this example embodiment, the network side may configure is different subframe patterns for neighboring cells such that the subframes bearing the STRS between neighboring cells will not be the same so as to avoid the interference of the STRS at the edge of neighboring cells. For example, in the TDD mode, if the cell A and the cell B are neighbor cells and both are in an uplink/downlink configuration mode 0, the base station employs the STRS with a period of 5 ms for the cell A and notifies that the value of the initial parameter within the radio frame is 1, that is, the subframes bearing the STRS in the cell A are #0 and #5, and that may be the same in each radio frame. The base station employs the STRS with a period of 5 ms for the cell B and notifies that the value of the initial subframe parameter within the radio frame is 2, that is, the subframes bearing the STRS in the cell B are #1 and #6. In this way, cells A and B use different subframes to send the STRS, thereby avoiding the STRS to exist in the same subframe to avoid the interference caused by the STRS.

For the subframe pattern combination, a fixed subframe mode can be used for further reducing the signaling interaction between the base station and the UE. For example, in addition to employing a fixed period for the STRS, the base station and the UE may further appoint that the subframe bearing the STRS is also fixed, such that the signaling does not need to be interacted between the base station and the UE. For example, it is possible to select one of the above-mentioned subframe pattern combinations corresponding to each uplink/downlink configuration to be used as the fixed subframe bearing the STRS.

This example embodiment may also support that, for using the above-mentioned mode and signaling when the STRS subframe is determined, the base station and the UE further appoint to introduce independent signaling for the configuration of the PSS/SSS of the new carrier and not imply by the signaling of the above-mentioned STRS. For example, one newly added signaling is used to indicate whether the PSS/SSS is configured in the new carrier for the UE.

In this example embodiment, the above-mentioned signaling of the subframe pattern combination of the STRS or the parameter of the initial subframe may not only notify the UE of the subframe configuration information of the STRS in the carrier, but also implicitly inform the UE of the following information: when the UE receives the signaling or parameter of the above-mentioned subframe pattern combination, the UE considers that the PSS/SSS is sent in the carrier bearing the STRS and simultaneously acquires that the UE is asynchronous with the carrier bearing the STRS. The UE needs to receive the PSS/SSS from the carrier bearing the STRS to accomplish the synchronization so as to exclude the possibility that the UE considers that it is synchronous with the carrier bearing the STRS by mistake to make the UE know its process. When the UE receives that the signaling or parameter of the above-mentioned subframe pattern combination is null, i.e., it is not sent, the UE considers that the signaling or parameter of the subframe pattern combination does not configure the PSS/SSS in the corresponding new carrier, and the UE is synchronous with the carrier, and does not need to execute the synchronization process.

By means of the methods for the signaling configuration, sending or reception provided by the above-mentioned embodiments, it provides a possibility to send the STRS between neighboring cells in a subframe orthogonal mode. By means of the STRS parameter introduced by the disclosure, it solves the problem of determining the subframe sending the STRS and also solves the problem that the base station sends the type information of new carrier or the information whether the PSS/SSS and/or STRS is sent in the new carrier to the UE at the same time.

Figure 5:
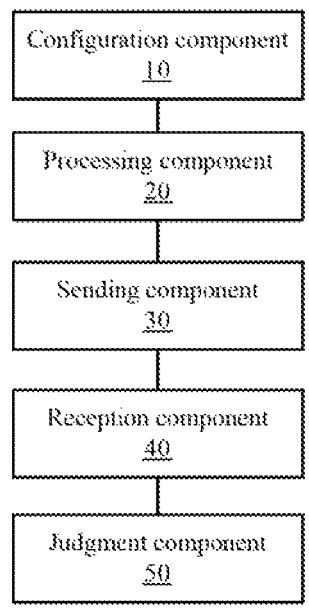
FIG. 5 shows a structure diagram of a device for signaling configuration according to embodiment I of the disclosure.

FIG. 5 shows a structure diagram of a device for the signaling configuration according to embodiment I of the disclosure, the device used for implementing the method for signaling configuration provided by the above-mentioned embodiment I, as shown in FIG. 5, the device mainly including: a configuration component 10, a processing component 20, a sending component 30, a reception component 40 and a judgment component 50. Wherein, the configuration component 10 is configured to configure the signaling describing the at least one subframe bearing the Synchronization Track Reference Signals (STRS) for a carrier; the processing component 20 is connected to the configuration component 10 and configured not to send the STRS and/or the Primary Synchronization Signal/Secondary Synchronization Signal (PSS/SSS) in the carrier when the signaling configured is null, while send the PSS/SSS in the carrier in a predetermined manner and send the STRS in the carrier according to the signaling configuration information when the signaling configured is not null; the sending component 30 is connected to the processing component 20 and configured to send the signaling; the reception component 40 is connected to the sending component 30 and configured to receive the signaling sent by the sending component and analyze the signaling; the judgment component 50 is connected to the reception component 40 and configured to judge that the PSS/SSS is not sent in the carrier when the signaling is null, or judge that the PSS/SSS is sent in the carrier when the signaling is not null.

Figure 6:
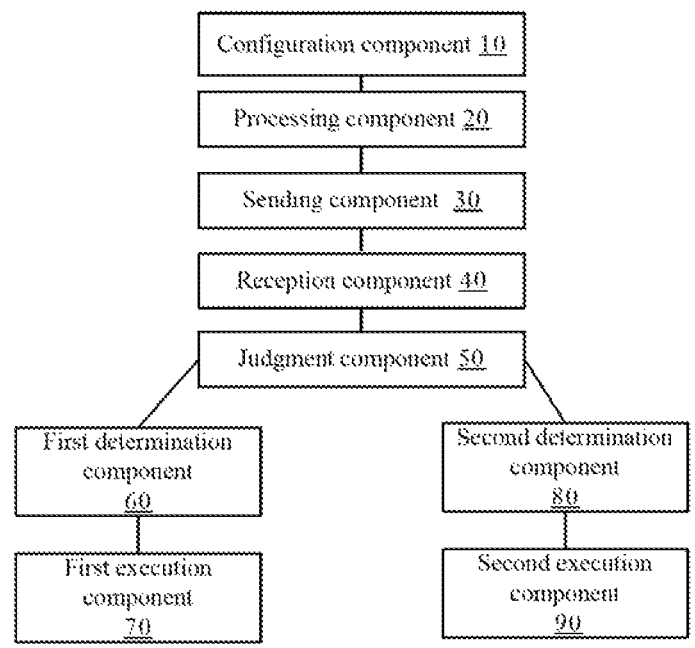
FIG. 6 shows a structure diagram of a device for signaling configuration according to an example embodiment of the embodiment I of the disclosure.

FIG. 6 shows a structure diagram of a device for the signaling configuration according to an example embodiment of the embodiment I of the disclosure, the example device is used to implement the method for the signaling configuration provided by the above-mentioned embodiment I, as shown in FIG. 6, the device also includes:

a first determination component 60 connected to the judgment component 50 and configured to determine that the carrier is synchronous with a compatible carrier corresponding to the carrier in time and frequency when the signaling is null; and a first execution component 70 connected to the first determination component 60 and configured to execute a synchronous operation between the User Equipment (UE) and the carrier in time and frequency, or determine that the carrier is a synchronous new carrier.

In the practical application, the device may also includes: a second determination component 80 connected to the judgment component 50 and configured to determine that the carrier is asynchronous with a compatible carrier corresponding to the carrier in time and frequency when the signaling is not null; and a second execution component 90 connected to the second determination component 80 and configured to receive the PSS/SSS from the carrier and execute an asynchronous operation between the User Equipment (UE) and the carrier in time and frequency, or determine that the carrier is an asynchronous new carrier.

In the described, embodiment, in the practical application, the signaling includes subframe pattern information of the subframe bearing the STRS, wherein the subframe pattern information includes one of the following: an initial subframe offset of the at least one subframe bearing the STRS in the radio frame, a subframe pattern combination for the at least one subframe bearing the STRS, and a subframe identification corresponding to the at least one subframe bearing the STRS.

Figure 7:
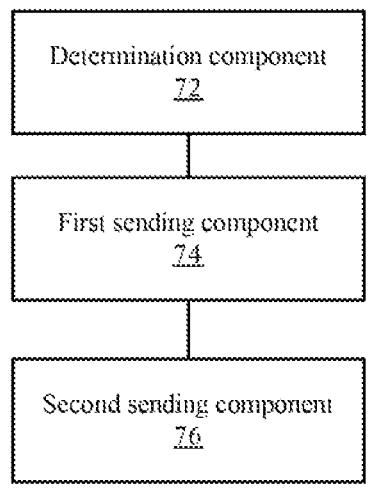
FIG. 7 shows a structure diagram of a device for signaling sending according to embodiment II of the disclosure.

FIG. 7 shows a structure diagram of a device for the signaling sending according to embodiment II of the disclosure, the device is used to implement the method for the signaling sending provided by the above-mentioned embodiment IT, as shown in FIG. 7, the device mainly includes: a determination component 72, a first sending component 74 and a second sending component 76. Wherein, the determination component 72 is configured to configure the signaling describing the at least one subframe bearing the Synchronization Track Reference Signals (STRS), and determines whether the signaling configured is null; the first sending component 74 is connected to the determination component 72 and configured not to send the STRS and/or the Primary Synchronization Signal/Secondary Synchronization Signal (PSS/SSS) in the new carrier if the determination result is positive, or send the PSS/SSS to a User Equipment (UE) in a predetermined manner in the new carrier if the determination result is negative, and send the STRS to the UE according to the configuration information of the configured signaling in the new carrier; and the second sending component 76 is connected to the first sending component 74 and configured to send the signaling to the UE in a compatible carrier corresponding to the new carrier.

Figure 8:
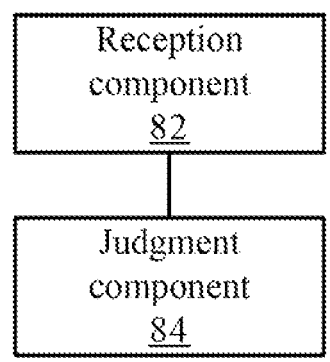
FIG. 8 shows a structure diagram of a device for signaling reception according to embodiment III of the disclosure.

FIG. 8 shows a structure diagram of a device for the signaling reception according to embodiment III of the disclosure, the device is used to implement the method for the signaling reception provided by the above-mentioned embodiment III, as shown in FIG. 8, the device mainly includes: a reception component 82 and a judgment component 84. Wherein, the reception component 82 is configured to receive, from a compatible carrier corresponding to the new carrier, the signaling describing the at least one subframe bearing the Synchronization Track Reference Signals (STRS) sent by the base station; and the judgment component 84 is configured to judge whether the signaling is null, and determine that if the judgment result is positive, the new carrier does not bear the STRS and/or the Primary Synchronization Signal/Secondary Synchronization Signal (PSS/SSS) and determine that the new carrier is synchronous with the compatible carrier in time and frequency, or determine that, if the judgment result is negative, the new carrier is bearing the PSS/SSS and receives the PSS/SSS from the new carrier, and determine that the new carrier is asynchronous with the compatible carrier in time and frequency.

By means of the devices for the signaling configuration, sending or reception provided by the above-mentioned embodiments, it provides the possibility to send the STRS between neighboring cells in a subframe orthogonal mode. By means of the STRS parameter introduced by the disclosure, it solves the problem of determining the subframe sending the STRS and the problem that the base station sends the type information of the new carrier or the information whether the PSS/SSS and/or the STRS is sent in the new carrier to the UE.

It can be seen from the above-mentioned description that the disclosure implements the following technical effects:

The disclosure introduces the STRS parameters, and implements the diversity of the subframe sending STRS at the same time, and provides the possibility for sending the STRS between neighboring cells in a subframe orthogonal way, and by the introduced STRS parameters in the disclosure, it solves the problem of determining the subframe sending STRS and the problem that the base station sends, to the UE, the type information of a new carrier or the information whether the PSS/SSS and/or the STRS is sent in the new carrier, so as to achieve the effect of saving the signaling overhead and avoiding the UE aimlessly detecting the type of a new carrier or detecting whether the PSS/SSS and/or STRS is configured in the new carrier.

Obviously, a person skilled in the art would understand that the above components and steps of the disclosure can be realized by using general calculating devices, and integrated in one calculating device or distributed on a network which consists of a plurality of calculating devices. Alternatively they can be realized by using the executable program code of the calculating devices, so that consequently they can be stored in the storing devices and executed by the calculating devices. In some cases, the above components and steps of the disclosure can perform the shown or described steps in sequence other than herein, or they are made into integrated circuit component respectively, or a plurality of components or steps thereof are made into one integrated, circuit component. Thus, the disclosure is not limited to any particular combination of hardware and software.

The above description is only example embodiments of the disclosure and is not intended to limit the disclosure, and the disclosure can have a variety of changes and modifications for ordinary persons skilled in the field. Any modification, equivalent, replacement, or improvement and so on made without departing from the principle of the disclosure should fall within the protection scope as defined by the appended claims of the disclosure.

What is claimed is:

1. A method for signaling sending, comprising:
   a base station configuring, for a carrier, a signaling describing subframes bearing Synchronization Track Reference Signals (STRS), and determining whether the signaling configured is null;
   if a determination result is positive, the base station does not send the STRS and/or Primary Synchronization Signal/Secondary Synchronization Signal (PSS/SSS) in the carrier, and if the determination result is negative, the base station sends the PSS/SSS to a User Equipment (UE) in the carrier according to a predetermined manner, and sending the STRS to the UE in the carrier according to the configuration information of the signaling configured; and the base station sending the signaling to the UE;

wherein the signaling comprises subframe pattern information of the subframes bearing the STRS;

wherein the carrier is a new carrier, wherein the base station sending the signaling to the UE comprises: the base station sending the signaling to the UE in a compatible carrier corresponding to the new carrier.

2. The method according to claim 1, wherein the subframe pattern information comprises one of the following:

an initial subframe offset of the subframes bearing the STRS in a radio frame, a subframe pattern combination for the subframes bearing STRS, and a subframe identification corresponding to the subframes bearing the STRS.

3. The method according to claim 2, wherein the base station sending the signaling to the UE comprises:

the base station sending the signaling to the UE by means of one of the following messages:

radio resource control connection reconfiguration (RRC Connection Reconfiguration), and measurement configuration (measConfig).

4. A base station, which comprises a hardware processor and a memory, and the hardware processor is configure to execute programming components stored in the memory, the programming components comprises:

a determination component, configured to configure, for a carrier, a signaling describing subframes bearing Synchronization Track Reference Signals (STRS), and determine whether the signaling configured is null;

a first sending component, configured not to send the STRS and/or Primary Synchronization Signal/Secondary Synchronization Signal (PSS/SSS) in the carrier when the determination result is positive, and configured to send the PSS/SSS to a User Equipment (UE) in the carrier according to a predetermined manner and send the STRS to the UE in the carrier according to the configuration information of the signaling configured when the determination result is negative; and a second sending component, configured to send the signaling to the UE;

wherein the signaling comprises subframe pattern information of subframes bearing the STRS;

wherein the carrier is a new carrier, the second sending component is configured to send the signaling to the UE in a compatible carrier corresponding to the new carrier.

5. The base station according to claim 4, wherein the subframe pattern information comprises one of the following:

an initial subframe offset of the subframes bearing the STRS in the radio frame, a subframe pattern combination for the subframes bearing STRS, and a subframe identification corresponding to the subframes bearing the STRS.

6. The base station according to claim 5, wherein the second sending component is configured to send the signaling to the UE by means of one of the following messages:

radio resource control connection reconfiguration (RRC Connection Reconfiguration), and measurement configuration (measConfig).

7. A method for signaling reception, comprising:

a User Equipment (UE) receiving a signaling that is sent by a base station for describing subframes bearing Synchronization Track Reference Signals (STRS); and the UE judging whether the signaling is null, and determining that the STRS and/or a Primary Synchronization Signal/Secondary Synchronization Signal (PSS/SSS) is not carried in the carrier, if the judgment result is positive, while determining that the PSS/SSS is carried in the carrier, receiving the PSS/SSS from the carrier, if the judgment result is negative;

wherein the signaling comprises subframe pattern information of the subframes bearing the STRS;

wherein the carrier is a new carrier, a User Equipment (UE) receiving a signaling that is sent by a base station for describing subframe bearing Synchronization Track Reference Signals (STRS) comprises: the UE receiving, from a compatible carrier corresponding to a new carrier, a signaling that is sent by a base station for describing subframe bearing STRS.

8. The method according to claim 7, wherein when the signaling is null, the method further comprises:

the UE determining that the carrier is synchronous in time and frequency with a compatible carrier corresponding to the carrier; and the UE executing a synchronous operation in time and frequency between the UE and the carrier, or determining that the carrier is a synchronous new carrier.

9. The method according to claim 7, wherein when the signaling is not null, the method further comprises:

the UE determining that the carrier is asynchronous in time and frequency with a compatible carrier corresponding to the carrier; and the UE receiving the PSS/SSS from the carrier, and executing a synchronous operation in time and frequency between the UE and the carrier; or determining that the carrier is an asynchronous new carrier.

10. The method according to claim 7, wherein the subframe pattern information comprises one of the following:

an initial subframe offset of the subframes bearing the STRS in a radio frame, a subframe pattern combination for the subframes bearing STRS, and a subframe identification corresponding to the subframes bearing the STRS.

11. The method according to claim 10, wherein a User Equipment (UE) receiving a signaling that is sent by a base station for describing subframes bearing Synchronization Track Reference Signals (STRS) comprises:

the UE receiving the signaling sent by the base station by means of one of the following messages:

radio resource control connection reconfiguration (RRC Connection Reconfiguration), and measurement configuration (measConfig).

12. A user equipment (UE), which comprises a hardware processor and a memory, and the hardware processor is configure to execute programming components stored in the memory, the programming components comprises:

a reception component, configured to receive a signaling that is sent by a base station for describing subframes bearing Synchronization Track Reference Signals (STRS); and a judgment component, configured to judge whether the signaling is null, and determine that the STRS and/or a Primary Synchronization Signal/Secondary Synchronization Signal (PSS/SSS) is not carried in the carrier, if the judgment result is positive, while determine that the PSS/SSS is carried in the carrier, receive the PSS/SSS from the carrier, if the judgment result is negative;

wherein the carrier is a new carrier, wherein the reception component is configured to receive, from a compatible carrier corresponding to a new carrier, a signaling that is sent by a base station for describing subframe bearing Synchronization Track Reference Signals (STRS);
wherein the signaling comprises subframe pattern information of the subframes bearing the STRS.

13. The UE according to claim 12, further comprising:
a first determination component, configured to determine that the carrier is synchronous in time and frequency with a compatible carrier corresponding to the carrier when the judgment component judges that the signaling is null; and
a first execution component, configured to execute a synchronous operation in time and frequency between a User Equipment (UE) and the carrier, or determine that the carrier is a synchronous new carrier.

14. The UE according to claim 12, further comprising:
a second determination component, configured to determine that the carrier is asynchronous in time and frequency with a compatible carrier corresponding to the carrier when the judgment component judges that the signaling is not null; and
a second execution component, configured to receive the PSS/SSS from the carrier, and execute a synchronous operation in time and frequency between the User Equipment (UE) and the carrier; or determine that the carrier is an asynchronous new carrier.

15. The UE according to claim 12, wherein the subframe pattern information comprises one of the following:
an initial subframe offset of the subframes bearing the STRS in a radio frame, a subframe pattern combination for the subframes bearing STRS, and a subframe identification corresponding to the subframes bearing the STRS.

16. The UE according to claim 15, wherein the reception component is configured to send the signaling to the UE by means of one of the following messages:
radio resource control connection reconfiguration (RRC Connection Reconfiguration), and measurement configuration (measConfig).

* * * * *